United States Patent [19]

Bostock et al.

[11] Patent Number: 5,359,043
[45] Date of Patent: Oct. 25, 1994

[54] REACTIVE DYES HAVING A SULPHONAMIDO GROUP

[75] Inventors: Stephen B. Bostock, Ramsbottom; Michael G. Hutchings, Holcombe; John A. Taylor, Manchester, all of England

[73] Assignee: Zeneca Limited, London, United Kingdom

[21] Appl. No.: 871,473

[22] Filed: Apr. 21, 1992

[30] Foreign Application Priority Data

May 17, 1991 [GB] United Kingdom ............... 9110689

[51] Int. Cl.$^5$ ..................... C09B 62/04; C09B 62/06; C09B 62/08; C09B 62/10
[52] U.S. Cl. .................................. 534/638; 534/617; 534/618; 534/622; 534/627; 534/620; 534/632; 534/634; 534/635; 534/637; 534/636; 540/126; 544/181; 544/187
[58] Field of Search ............... 534/617, 632, 634, 618, 534/636, 620, 627, 622; 544/181, 187; 540/126

[56] References Cited

U.S. PATENT DOCUMENTS

| | | | |
|---|---|---|---|
| 4,255,325 | 3/1981 | Harms et al. | 534/638 X |
| 4,806,640 | 2/1989 | Harms et al. | 544/76 |

FOREIGN PATENT DOCUMENTS

| | | | |
|---|---|---|---|
| 1036563 | 8/1958 | Fed. Rep. of Germany | 534/638 |
| 2261505 | 6/1973 | Fed. Rep. of Germany | 534/638 |
| 1462977 | 12/1966 | France | 534/638 |
| 2409291 | 6/1979 | France | 534/638 |
| 0043651 | 2/1961 | Poland | 534/638 |
| 0879578 | 10/1961 | United Kingdom | 534/638 |
| 0952068 | 3/1964 | United Kingdom | 534/638 |
| 1023372 | 3/1966 | United Kingdom | 534/638 |
| 1044244 | 9/1966 | United Kingdom | 534/638 |

OTHER PUBLICATIONS

Chemical Abstracts, vol. 54, 24827b, Sasse et al., II (1960).
Chemical Abstracts, vol. 58, (1967), No. 11499q Instytut(II).

*Primary Examiner*—Floyd D. Higel
*Attorney, Agent, or Firm*—Cushman, Darby & Cushman

[57] ABSTRACT

A water soluble dye having a reactive group of the formula:

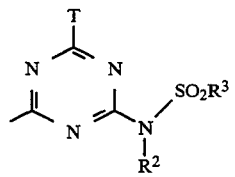

wherein:
T is a labile atom or group; and
$R^2$ and $R^3$ are each independently a non-chromophoric optionally substituted aryl or alkyl group.

5 Claims, No Drawings

REACTIVE DYES HAVING A SULPHONAMIDO GROUP

This invention relates to reactive dyes, and more particularly water soluble reactive dyes of the azo, anthraquinone, formazan, triphenodioxazine and phthalocyanine series, to a process for their manufacture, to a process for the coloration of materials having amino or hydroxyl groups, such as natural and regenerated cellulose, wool, silk and polyamide fibres and fabrics, and to such materials when coloured by the dyes.

According to the invention there is provided a water-soluble dye having a reactive group of the formula:

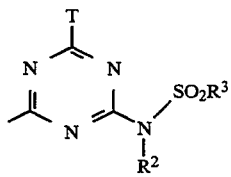

T is a labile atom or group; and
$R^2$ and $R^3$ each independently is a non-chromophoric optionally substituted aryl or alkyl group.

By a labile atom or group, it is meant an atom or group which is bound by a chemical bond to the triazine nucleus, which atom or group is readily replaced by a hydroxyl group in mildly alkaline aqueous conditions. As examples of such atoms or groups, there may be mentioned halogen atoms such as F and Cl; sulphonic acid groups; thiocyano groups; quaternary ammonium groups such as trialkylammonium groups; and optionally substituted pyridinium groups such as 3- or 4-carboxypyridinium groups. It is preferred that T is halo, especially fluoro or chloro; or 3- or 4-carboxypyridinium.

The term non-chromophoric means that the group does not significantly absorb visible light and therefore does not impart visible colour to a reactive dye of the invention, i.e., it does not affect the shade of the water-soluble dye. The water-soluble dye preferably contains 1, 2 or 3 of said reactive groups.

A preferred dye according to the invention is a water soluble reactive dye of the Formula (1):

wherein each Z independently is

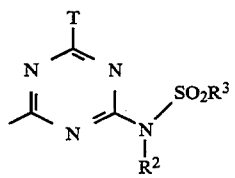

D is a chromophoric group;
each $R^1$ independently is H or optionally substituted alkyl;
n is 1 or 2; and
T, $R^2$ and $R^3$ are as hereinbefore defined.

D can be any chromophoric group, but is preferably of the azo, (for example azo pyridone), triphenodioxazine, anthraquinone, phthalocyanine or formazan series, more preferably of the triphenodioxazine series, and it is particularly preferred that D is a chromophoric group of the azo series. When D is a chromophoric group of the azo series it is preferably a mono- or disazo chromophoric group. D preferably has one or more, and especially from 1 to 6, water solubilising groups, such as carboxy or preferably sulpho.

The group represented by D may include a further cellulose-reactive group in addition to the group or groups represented by $-NR^1Z$. The further cellulose-reactive group can be any of known cellulose reactive groups, but is preferably of the pyrimidinyl amino, or more preferably of the triazinylamino or vinyl sulphone series.

The preferred pyrimidinylamino cellulose-reactive groups are trichloropyrimidinylamino, and especially difluorochloropyrimidinylamino groups.

The preferred triazinylamino cellulose-reactive groups are of the formula:

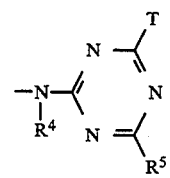

wherein T is as hereinbefore defined; $R^5$ is T (as hereinbefore defined), alkoxy, especially $C_{1\text{-}4}$-alkoxy; amino; or anilinyl which is optionally substituted by a sulpho and/or carboxy group; and $R^4$ is H or $C_{1\text{-}4}$-alkyl.

Reactive groups of the vinyl sulphone series include vinyl sulphonyl groups and groups which are convertible to a vinyl sulphonyl group in the presence of aqueous alkali, for example $-CH_2CH_2OSO_3H$ and $-CH_2CH_2SSO_3H$.

When $R^1$ is optionally substituted alkyl it is preferably alkyl having up to four carbon atoms, especially methyl.

It is preferred that one, or more preferably both, of $R^2$ and $R^3$ is optionally substituted alkyl. When only one of $R^2$ and $R^3$ is optionally substituted alkyl, it is preferably $R^2$. These preferences result from the finding that when $R^3$, and especially when both $R^2$ and $R^3$, are optionally substituted alkyl the dye has particularly good build up properties.

When $R^2$ or $R^3$ is optionally substituted aryl it is preferably optionally substituted phenyl, and in particular phenyl substituted by one or two groups selected from sulpho and methyl.

When $R^2$ or $R^3$ is optionally substituted alkyl, it preferably contains up to four carbon atoms, especially $C_{1\text{-}4}$-alkyl, and is more preferably methyl.

A dye according to the invention may be prepared by a process comprising the condensation of a dye having a nucleophilic group, for example a hydroxy or amino group, with a compound of Formula (3) as defined herebelow. A preferred dye having a nucleophilic group is of Formula (2).

Accordingly the present invention also provides a process for the preparation of a dye of Formula (1) wherein substantially one molecular proportion of a compound of Formula (2) is condensed with n molecular proportions of a compound of Formula (3):

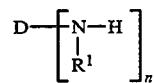  (2)

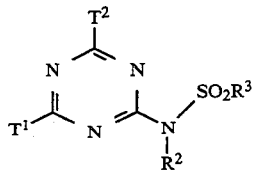  (3)

wherein D, $R^1$, $R^2$, $R^3$ and n are as hereinbefore defined and $T^1$ and $T^2$ are halogen atoms. If desired the halogen atom $T^2$ may subsequently be replaced by the desired labile atom or group represented by T (as hereinbefore defined) using conventional chemistry, for example heating with a quaternary ammonium or optionally substituted pyridine compound.

The above processes may conveniently be carried out by mixing an aqueous suspension or solution of a dye having a nucleophilic group or of the compound of Formula (2) and a solution or suspension or composition containing the compound of Formula (3), preferably in the presence of an acid-binding agent. The function of the acid-binding agent is to neutralise the hydrogen halide as it is formed during the reaction. Accordingly any acid-binding agent may be used provided that it is not present in such a concentration that it causes hydrolysis of the reactants or causes some other side-reaction. It is preferred to use an alkali metal carbonate or bicarbonate, added at such a rate that the pH of the mixture stays within the range of 6.0 to 8.0. The temperature of reaction may be between 0° C. and 100° C. dependent on the ease with which the reaction occurs. In general dihalogeno-1,3,5-triazines of Formula (3) require a temperature of the order of 10° to 40° C. in order to condense with a compound of Formula (2).

As will be appreciated, more or less than one molecular proportions of a compound of Formula (2) can be used in the above process (e.g. 0.5–1.5 and especially 0.9–1.1 molecular proportions), but this is less preferred since it is wasteful of whichever compound is in excess.

The compounds of Formula (3) can be prepared by condensation of a trihalogeno-1,3,5-triazine with a compound of formula $R^2NH.SO_2R^3$, preferably in the presence of an acid-binding agent, or with an alkali metal salt of a compound of formula $R^2NH.SO_2R^3$ in an inert solvent.

As examples of preferred compounds of Formula (1) there may be mentioned compounds of the following classes, without however, limiting the invention to the classes specifically described.

Class 1 Monoazo compounds of the Formula (4):

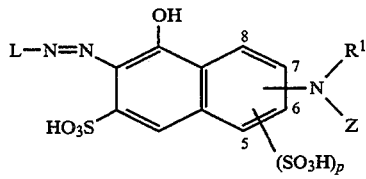  (4)

wherein:
Z and $R^1$ are as hereinbefore defined;
L is an optionally substituted mono- or di-cyclic aryl radical; and
p is 0 or 1.

In Formula (4) the group represented by $-NR^1Z$ is preferably at the 6-, 7- or 8- position, especially the 6- or 8- position. When $-NR^1Z$ is at the 8- position it is preferred that p is 1 and the sulpho group is at the 6- position.

L is preferably an optionally substituted phenyl or naphthyl group. When L is substituted the substituent or substituents are preferably a cellulose-reactive substituent, for example a vinyl sulphonyl group, a group which is convertible to a vinyl sulphonyl group in the presence of aqueous alkali, one of the above mentioned pyrimidinylamino or triazinylamino cellulose-reactive groups, or a group of formula $-NR^1Z$ wherein $R^1$ and Z are as hereinbefore defined; or a halogen atom, especially chlorine; an alkyl radical, especially $C_{1-4}$-alkyl, more especially methyl; an acylamino radical, especially acetylamino, benzamido or sulphonated benzamido; amino; hydroxy; or an alkoxy radical especially $C_{1-4}$-alkoxy, more especially methoxy.

Class 2 Disazo compounds of formula:

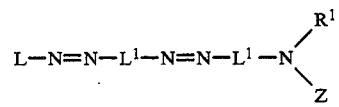

wherein each $L^1$ independently is a divalent mono- or dicyclic aryl radical; L, $R^1$ and Z are as hereinbefore defined.

The preferred divalent mono- or dicyclic aryl radical represented by $L^1$ is an optionally substituted phenylene or naphthylene group. Preferred optional substituents are selected from those mentioned above for L.

Preferred disazo compounds are analogues of the mono azo compounds of Formula (4), wherein in place of the group defined by L there is a group of the formula:

wherein A and B are each independently optionally substituted phenyl or naphthyl. It is preferred that A is optionally substituted phenyl and B is optionally substituted naphthyl. The optional substituents which may be present on A or B are preferably independently selected from those mentioned above for L.

Class 3 Azo compounds of the Formula (5):

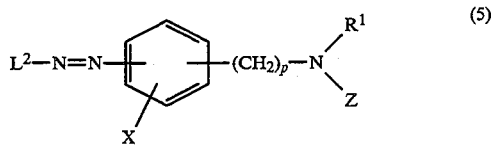  (5)

wherein p is 0 or 1; Z and $R^1$ are as hereinbefore defined; $L^2$ is an optionally substituted mono- or di-cyclic aryl radical; and X is halogeno, preferably chloro; alkyl, especially $C_{1-4}$-alkyl; alkoxy, especially $C_{1-4}$-alkoxy; carboxy; ureido; or acylamino such as acetamido.

Preferred mono-cyclic aryl radicals represented by $L^2$ are optionally substituted phenyl, optionally substituted pyrazolonyl and optionally substituted pyridonyl. Preferred optionally substituted phenyl groups are those mentioned for L in Class 1 above, and preferred pyridonyl groups are 2,6-dihydroxypyridon-5-yl groups, especially those having a $C_{1-4}$-alkyl group at the 4-position and/or a —CN or —$CONH_2$ group at the 3-position.

Preferred di-cyclic aryl radicals are optionally substituted naphthyl, especially those mentioned for L in Class 1 above.

It is preferred that when p is 1, $L^2$ is a coupling component. Suitable coupling components will be apparent to dye chemists, and comprise compounds which are capable of reacting with a diazo component. Examples of preferred coupling components are J-Acid, H-Acid, Gamma-Acid, 2R-Acid and the like. It is particularly preferred that X is sulpho or ureido. When p is 0 the group —$NR^1Z$ is preferably para to the azo group $L^2$—N=N—.

Class 4

The metal complex, e.g. the copper, chromium and cobalt complex, compounds of those dyes of Classes 1, 2 and 3 which contain one or preferably two metallisable (for example, a hydroxyl, methoxy, ethoxy or carboxylic acid) group ortho to an azo group.

Class 5 Anthraquinone compounds of the Formula (6):

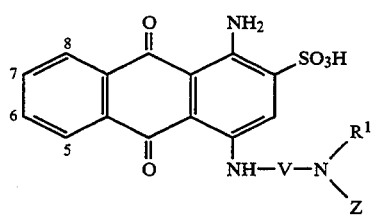
(6)

wherein the anthraquinone nucleus optionally contains a sulphonic acid group in one or more of the 5-, 6-, 7- and 8-positions; Z and $R^1$ are as hereinbefore defined; and V is a divalent organic linking group, preferably a radical of the benzene series, for example a phenylene, diphenylene, 4,4'-divalent stilbene or azobenzene radical which is optionally sulphonated. It is preferred that V contains one sulphonic acid group for each benzene ring present.

Class 6 Phthalocyanine compounds of the formula:

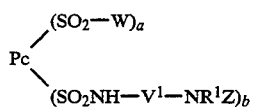

wherein Z and $R^1$ are as hereinbefore defined; Pc is a metallophthalocyanine nucleus, preferably copper or nickel phthalocyanine; each W independently is a hydroxy or a substituted or unsubstituted amino group; $V^1$ is a divalent organic linking group, preferably $C_{1-4}$-alkylene, phenylene or sulphophenylene; and a and b are each independently 1, 2 or 3 provided that a+b is not greater than 4.

Class 7 Triphenodioxazine compounds of the formula:

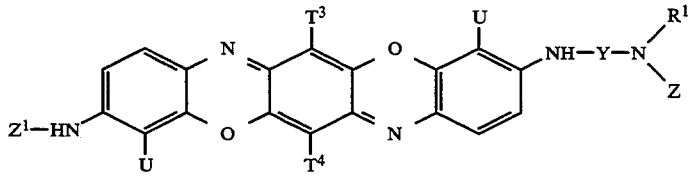

wherein:
$Z^1$ is H or a group of formula

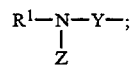

Z and $R^1$ are each independently as hereinbefore defined;
each Y independently is $C_{2-4}$-alkylene, phenylene or sulphophenylene;
U is H or $SO_3H$; and
$T^3$ and $T^4$ are halo, especially chloro, or $C_{1-4}$-alkyl.

It is preferred that $R^1$ is H or $C_{1-4}$-alkyl, especially H.
Each Y is preferably —$C_2H_4$— or —$C_3H_6$—. U is preferably $SO_3H$.
$T^3$ and $T^4$ are preferably Cl or methyl.

Class 8 Formazan compounds of the formula:

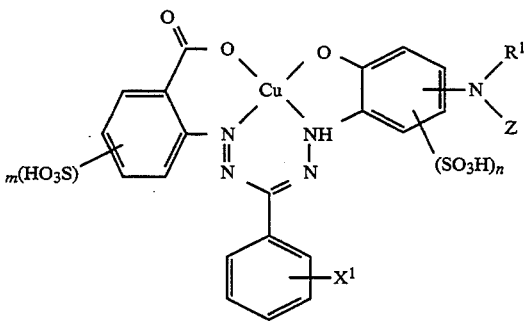

wherein:
Z and $R^1$ are as hereinbefore defined;
$X^1$ is H, $SO_3H$ or Cl; and
n and m each independently have a value of 0, 1 or 2; provided that the dye has at least one, and preferably at least two, sulpho groups.

It is preferred that m and n each have a value of 1.

Although dye formulae have been shown in the form of their free acid in this specification, the invention also relates to the dyes in the salt form, particularly their salts with alkali metals such as the sodium, lithium or mixed sodium/lithium salt and optionally substituted ammonium salts. The term aryl as used in this specification includes heteroaryl.

A further feature of the present invention provides a composition comprising an inert carrier and a dye according to the invention, preferably in a weight ratio of 1:99 to 99:1, more preferably 50:1 to 1:50, especially 20:1 to 1:20. The inert carrier preferably comprises inorganic salts and optionally a de-dusting agent. Examples of inorganic salts include alkali and alkaline earth metal halides, carbonates, bicarbonates, nitrates and mixtures thereof. Dodecylbenzene may be used as de-dusting agent.

The reactive dyes of the present invention are suitable for colouring natural and artificial textile materials containing amino or hydroxyl groups, for example textile materials such as wool, silk, polyamides and modified polyacrylonitrile fibres, and more especially cotton, viscose rayon and other regenerated cellulosic materials. For this purpose the dyes can be applied to the textile materials by exhaust dyeing, or preferably dyeing from long liquors or by padding or by printing using printing pastes containing the conventional thickening agents or oil-in-water emulsions, whereby the textile materials are coloured bright shades and possess good fastness to light and to wet treatments such as washing and also possess good wash off.

The dyes of the invention, particularly those in which one or both of $R^2$ and $R^3$ are alkyl, have a reactivity intermediate between that of dichlorotriazinyl dyes and monochlorotriazinyl dyes in which the $SO_2$ group in Z is absent which renders them useful for both exhaust dyeing and pad batch dyeing. It is important that $R^2$ is not so that deactivating ionisation by removal of $R^2$ does not occur to a significant extent under normal dyeing conditions. Furthermore, the increased reactivity of the dyes relative to monochlorotriazinyl dyes means that exhaust dyeing may be carried out at lower temperatures than normal leading to significant energy and cost savings.

According to a further feature of the present invention there is provided the use of a compound of Formula (3), wherein $T^1$, $T^2$, $R^2$ and $R^3$ are as hereinbefore defined, in the preparation of a dye. The preferences for $T^1$, $T^2$, $R^2$ and $R^3$ are also as hereinbefore described.

A compound of Formula (3) may be used to prepare a dye by condensation with a chromophoric compound having a nucleophilic group, for example a thiol, hydroxy or preferably an amino group. Preferably the condensation is performed in aqueous solvent, more preferably in the presence of an acid binding agent.

The new dyes are particularly valuable for colouring cellulosic materials. A further feature of the invention comprises a process for the coloration of a cellulosic material, especially a cellulosic textile material, by applying thereto a compound according to the invention. For this purpose the dyes are preferably applied to the cellulosic textile material in conjunction with a treatment with an acid-binding agent, for example, sodium bicarbonate, sodium carbonate, sodium metasilicate, trisodium phosphate or sodium hydroxide, which may be applied to the cellulose textile material before, during or after the application of the dye.

The new dyes can be applied to textile materials containing amino groups, such as wool and polyamide textile materials, from a mildly alkaline, neutral or acid dyebath. The dyebath may contain substances which are commonly used in the dyeing of textile materials containing amino groups, for example ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

Alternatively the new dyes can be applied to textile materials by any of the known printing methods, including ink jet printing.

The invention is illustrated but not limited by the following Examples in which all parts and percentages are by weight unless stated otherwise.

EXAMPLE 1

Preparation of the Compound of Formula (7) Wherein L is 1-amino-2-(2,5-disulphophenylazo)-8-hydroxy-3,6-disulphonaphth-7-yl, X is $SO_3H$, T is Cl, $R^1$ is H, $R^2$ is 4-sulphophenyl and $R^3$ is 4-methylphenyl

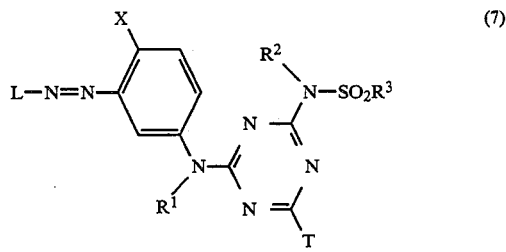

Stage 1

A solution of p-toluenesulphonsulphanilate (8.95 g) in water (100 ml) and 1N sodium hydroxide solution (25 ml) was added to a solution of cyanuric chloride (5 g) in acetone (50 ml) and the mixture stirred at pH 7, 0° to 5° C., for 3 hours. A solid precipitate of N-(4,6-dichloro-s-triazin-2-yl)-p-toluenesulphanilate was collected, washed with acetone and used without further purification.

Stage 2

The N-(4,6-dichloro-s-triazin-2-yl)-p-toluenesulphanilate resulting from Stage 1 was added to a stirred solution of 1-amino-2-(2,5-disulphophenylazo)-7-(2-sulpho-5-aminophenylazo)-8-hydroxynaphthalene-3,6-disulphonic acid (MI=1076, 20.12 g, 0.0187 m). The mixture was stirred for 16 hours at pH 7 and 20° C., then aqueous salt solution (15% w/v) was added and the precipitated title product in the form of its sodium salt was collected. Yield 39.5 g (approximately 80%) of Navy blue dye.

EXAMPLE 2

Preparation of the compound of Formula:

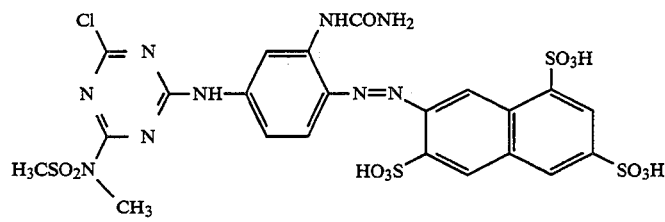

Stage 1

A solution of methanesulphonmethylamide (63.5 g) in water (80 ml) was added to a solution of sodium hydroxide (23.3 g) in water (30 ml). Toluene (200 ml) was added and water removed in the form of an azeotrope with toluene. Cyanuric chloride (108 g) was added and the mixture was stirred at below 3° C. for 8 hours, followed by stirring at room temperature for 12 hours to give a suspension. A solid was filtered off from the suspension and the toluene removed from the filtrate in vacuo to give a white solid which was recrystallised from toluene/petroleum ether, b.pt. 100–120 to give 97 g of 2,4-dichloro-6-(N-methanesulphonyl)methylamino-s-triazine as a solid (65% yield), m.pt. 90°–92° C.

Stage 2

An aqueous solution of 3-ureido-4-(3,6,8-trisulphonaphth-2-ylazo)aniline (M.I. 845, 16.9 g) was added to a solution of N(4,6-dichloro-s-triazyl)methane sulphonmethylamide (5.14 g) in acetone. The pH was maintained between 6.5 and 7.0, and the temperature was raised to 45° C. over 1 hour. After stirring at 40° to 45° C. for a further 1 hour the solution was filtered to remove any traces of insoluble materials, the filtrate was allowed to cool to 20° C. and potassium chloride (45 g, 10% w.v) was added. The title product precipitated in the form of its alkali metal salt and was collected and dried to give 18.7 g of reddish yellow dye.

EXAMPLE 3

Preparation of the compound of Formula (7) wherein L is
1-amino-2-(2,5-disulphophenylazo)-8-hydroxy-3,6-disulphonaphth-7-yl, X is $SO_3H$, T is Cl, $R^1$ is H, and $R^2$ and $R^3$ are both methyl A solution of 1-amino-(2,5-disulphophenylazo)-2-(2-sulpho-5-aminophenylazo)-8-hydroxynaphthalene-3,6-disulphonic acid (M.I. 1050, 21.0 g) was added to a stirred solution of 2,4-dichloro-6-(N-methanesulphonyl)methylamino-s-triazine (5.14 g) at 20° C. The pH was maintained at 6.5 and further 2,4-dichloro-6-(N-methanesulphonyl)methylamino-s-triazine (0.92 g) was added in small portions over 2 hours after which reaction was essentially complete. Ethanol was added to the stirred reaction mixture to precipitate 19.9 g of the title product as a navy blue solid.

EXAMPLE 4

Preparation of the compound of Formula (7) wherein L is 1-benzamido-3,6-disulpho-8-hydroxynaphth-7-yl, X is $SO_3H$, T is Cl, $R^1$ is H and $R^2$ and $R^3$ are both methyl Stage 1—Diazotisation 2,4-Dichloro-6-methanesulphonmethylamide-1,3,5-triazine was dissolved in acetone at room temperature and reprecipitated by pouring onto a mixture of ice and water (100 g), to give a finely divided white precipitate. This white precipitate was stirred at below 10° C. for a few minutes together with calsolene oil to give a suspension. Meanwhile m-phenylenediamine sulphonic acid ortho sulphonic acid ("mpds") was dissolved at room temperature and pH 7 in 150 ml deionised water and added to the suspension dropwise over 30 minutes at pH 5–6 and a temperature of below 15° C. When the addition was complete the reaction mixture was stirred at 25°–30° C., pH 5–7, for 2 hours and then for convenience at room temperature overnight. To this well stirred solution was then added 12 ml 2N sodium nitrite solution and the reaction mixture cooled to below 10° C. 8 ml of concentrated hydrochloric acid was added dropwise over 30 minutes and the resultant diazotised suspension/solution was stirred in excess nitrous acid for 30 minutes.

Stage 2—Coupling

The excess nitrous acid in the product of Stage 1 was destroyed by the addition of solid sulphamic acid. The resultant mixture was added slowly, at below 5° C., pH 6.5–7.0, over 30 minutes to a suspension of N-benzoyl H-acid in 100 ml water at below 10° C. When the addition was complete the reaction mixture was stirred at below 10° C. for 4 hours. The product was then precipitated by the addition of 10% potassium chloride solution, filtered, washed with 500 ml of 10% potassium chloride solution and finally sucked dry to give a cake. The cake was stirred for 1 hour in 1 liter of acetone, filtered, washed with a little acetone, and sucked dry. The dried cake was dissolved in water, screened and dialysed free from potassium chloride and finally dried in vacuo at 40° C. on a rotary evaporator. The resultant red solid was further dried under vacuum over phosphorus pentoxide for 18 hours to give 16.6 g of title product (Average MI 906). Elemental analysis of the product found 11.0% Nitrogen (theory 11.6% Nitrogen).

EXAMPLE 5

Preparation of the compound of Formula (7) wherein L is 1-benzamido-3,6-disulpho-8-hydroxynaphth-7-yl, X is $SO_3H$, T is 4-carboxypyridinium, $R^1$ is H and $R^2$ and $R^3$ are both methyl To a solution of the product of Example 4 (0.04 moles) in 1.2 liters of deionised water at pH 7 was added a solution of iso-nicotinic acid (49 g) in water (200 ml). The mixture was stirred for 8 hours at 70°±5° C., pH 5–6, cooled and the product precipitated by addition of 30% aqueous potassium chloride solution and dried to give a solid. The solid was dissolved in deionised water and dialysed substantially free from KCl, screened, and dried over phosphorus pentoxide in vacuo to give 30.5 g of title product as a red solid (Average MI 1082). Elemental analysis showed the product contained 37.0% carbon (theory 36.5% carbon).

This example can be repeated except that in place of iso-nicotinic acid there is used nicotinic acid to give a compound according to the title except that T is 3-carboxypyridinium.

EXAMPLE 6

Preparation of the compound of Formula (7) wherein L is 1-benzamido-3,6-disulpho-8-hydroxynaphth-7-yl, X is $SO_3H$, T is Cl, $R^1$ is methyl and $R^2$ and $R^3$ are both methyl The method of Example 4 was followed except that in place of mpds there was used an equivalent amount of N-methyl mpds to give the title product as a red solid. Elemental analysis showed the product contained 35.3% carbon (theory 35.2% carbon).

EXAMPLE 7

Preparation of the compound of Formula (7) wherein L is 1-benzamido-3,6-disulpho-8-hydroxynaphth-7-yl, X is $SO_3H$, T is 4-carboxypyridinium, $R^1$ is methyl and $R^2$ and $R^3$ are both methyl The product from Example 6 was converted into the title product on a scale of 0.1 moles by exchange of the triazinyl chloro group by iso-nicotinic acid using the method of Example 5 wherein in place of the product of Example 4 there is used 0.1 moles of the product of Example 6. 75.1 g of red solid was obtained.

This example can be repeated except that in place of iso-nicotinic acid there is used nicotinic acid to give a compound according to the title except that T is 3-carboxypyridinium.

EXAMPLE 8

Preparation of the compound of Formula:

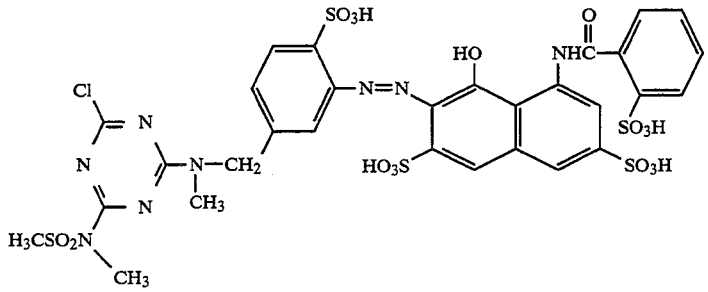

Stage 1

3-amino-4-sulpho-N-methylbenzylamine was dissolved at below 10° C. in a mixture of deionised water and concentrated hydrochloric acid and stirred for a few minutes. To this was added dropwise over 15 minutes, 2N sodium nitrite solution and the reaction mixture stirred at below 10° C. for 1 hour. The resultant solution was added dropwise over 30 minutes to a solution of N-orthosulphobenzoyl H-acid in 100 ml of water at pH 6. When the addition was complete, the mixture was stirred at below 10° C., pH 6, for 3 hours. The product was precipitated by the addition of 60% anhydrous potassium acetate and 2 liters of ethanol. The product was then filtered off, washed with ethanol, and dried. The product was dissolved in water, screened, and dried in vacuo over phosphorus pentoxide to give 26.2 g of 3-{1-hydroxy-3,6-disulpho-8-(2-sulphobenzoyl)aminonaphth-2-ylazo}-4-sulphobenzyl-N-methylamine.

Stage 2

2,4-Dichloro-6-methanesulphonmethylamide-1,3,5-triazine was dissolved in acetone at room temperature and reprecipitated by pouring onto a mixture of ice and water (100 g), to give a finely divided white precipitate. This white precipitate was stirred together with calsolene oil at below 10° C. for a few minutes. A solution of the product from Stage 1 in water at pH 6 was added, dropwise over 30 minutes. When the addition was complete, the resultant mixture was stirred at pH 6–6.5 and a temperature of 25°–30° C. for 18 hours. The product was precipitated by the addition of 20% anhydrous potassium acetate, filtered off, washed, re-dissolved in water, screened free from insoluble material and dialysed. The resultant solution was dried in vacuo at 40° C. to give 11.3 g of title product as a red solid. Elemental analysis showed the product contained 29.2% carbon (theory 29.6% carbon).

EXAMPLE 9

Preparation of the compound of Formula:

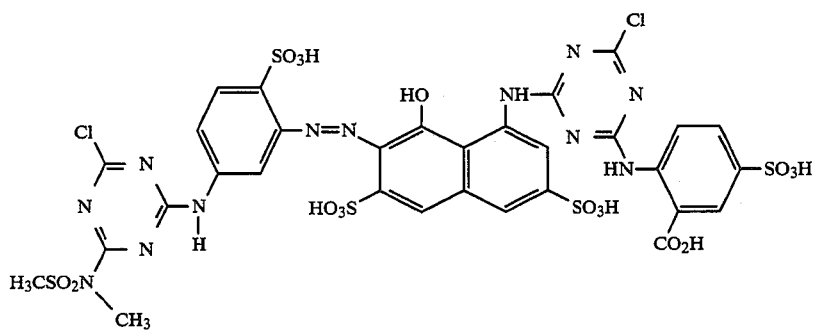

To a suspension of cyanuric chloride (3.7 g) in water (100 g) at below 3° C. and pH 3–4 was added a solution of H-Acid (7.8 g in 160 ml water) over 30 minutes. After 3 hours further stirring at 0°–5° C., pH 4–5, a suspension of the diazonium salt from Example 4, Stage 1, was added dropwise over 1 hour, keeping the temperature below 10° C. and pH approximately 4. When the addition was complete the red suspension was stirred for 3 hours before adding 2-carboxy-4-sulphoaniline (11.6 g) in water (100 ml). The mixture was stirred at 30°–35° C., pH 6–6.5, for 18 hours, precipitated by the addition of 15% KCl solution, filtered off, dried, washed with acetone, dialysed substantially free from KCl and again dried in vacuo to give 24 g of title compound as a bright red solid. (MI 1306).

EXAMPLE 10

Preparation of the compound of Formula (8) wherein L is 2-sulpho-4-methoxyphenyl, —NR$^1$ is connected to the 6-position, q is 0, T is Cl, and R$^1$, R$^2$ and R$^3$ are each methyl

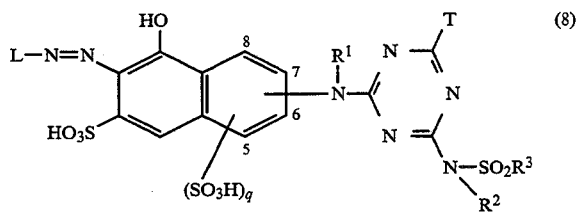

A solution of 1-hydroxy-2-(4-methoxy-2-sulphophenylazo)-6-methylaminonaphthalene-3-sulphonic acid (12.72 g) in water (500 ml) at pH 6.5 was added to a solution of 2,4-dichloro-6-(N-methanesulphonyl)methylamino-s-triazine in acetone (100 ml). The mixture was stirred at 25° C. and pH 6.5 for 1 hour after which the reaction was essentially complete. Potassium chloride (20% w/v) was added to give 9.9 g of title product as a scarlet solid.

EXAMPLE 11

Preparation of the compound of Formula (8) wherein L is 1,5-disulphonaphth-2-yl, —$NR^1$ is connected to the 6-position, q is 0, T is Cl, and $R^1$, $R^2$ and $R^3$ are each methyl The method of Example 10 was followed on the 0.2 mole scale except that in place of 1-hydroxy-2-(4-methoxy-2-sulphophenylazo)-6-methylaminonaphthalene-3-sulphonic acid there was used an equivalent amount of 1-hydroxy-2-(1,5-disulphonaphthyl-2-azo)-6-methylaminonaphthalene-3-sulphonic acid and the mixture was stirred for 18 hours instead of 1 hour. 15.8 g of the title product was obtained as an orange solid. Elemental analysis showed the product contained 33.2% carbon (theory 32.7% carbon).

EXAMPLE 12

Preparation of the compound of Formula (8) wherein L is 1,5-disulphonaphth-2-yl, —$NR^1$ is connected to the 6-position, q is 0, T is iso-nicotinyl, and $R^1$, $R^2$ and $R^3$ are each methyl 0.04 moles of product obtained by the reaction described in Example 11 was converted to the title compound using the method of Example 5, except that in place of the product of Example 4 there was used an equivalent amount of the product from Example 11. The title compound was obtained as a bright orange solid in a yield of 30.2 g.

This example can be repeated except that in place of iso-nicotinic acid there is used nicotinic acid to give a compound according to the title except that T is 3-carboxypyridinium. Elemental analysis showed the product contained 38.7% carbon (theory 38.1% carbon).

EXAMPLE 13

Preparation of the compound of Formula (8) wherein L is 1,5-disulphonaphth-2-yl, —$NR^1$ is connected to the 6-position, q is 0, T is Cl, $R^1$ is H, $R^2$ and $R^3$ are each methyl The method of Example 10 was followed on the 0.04 mole scale except that in place of 1-hydroxy-2-(4-methoxy-2-sulphophenylazo)-6-methylaminonaphthalene-3-sulphonic acid there was used 1-hydroxy-2-(1,5-disulphonaphth-2-ylazo)-3-sulpho-6-aminonaphthalene. The title product was obtained as an orange solid in a yield of 34.9 g. Elemental analysis showed the product contained 31.6% carbon (theory 31.9% carbon).

EXAMPLE 14

Preparation of the compound of Formula (8) wherein L is 4-(2-vinyl sulphonyl)phenyl, —$NR^1$ is connected to the 8-position, q is 1 and the sulphonic acid group is attached to the 6-position, T is Cl, and $R^1$ is H, $R^2$ and $R^3$ are both methyl

Stage 1—Diazotisation

To a well stirred mixture of 4-aminophenyl-beta-sulphato ethyl sulphone (28.2 g) at 0°-5° C. in 400 ml deionised water was added 2N sodium nitrite solution (50 ml) and the resultant mixture stirred at 0°-5° C. for 0.25 hours. To this mixture was added, all at once, concentrated hydrochloric acid solution (3.5 molar, 35 ml) and the reaction mixture stirred for 1 hour at below 10° C. Excess nitrous acid was then destroyed by the addition of solid sulphamic acid to give a diazonium salt.

Stage 2—Coupling

N-acetyl H-acid (60 g) was dissolved at pH 7-8 in 400 ml deionised water at below 10° C. in an ice bath. The diazonium salt from Stage 1 was added dropwise over 0.5 hour at below 10° C. and pH 5-6 (the pH was adjusted using solid sodium carbonate). The resultant mixture was stirred at below 10° C. for 4 hours, and then allowed to warm to room temperature. The dark coloured product which precipitated was filtered off, and pulled dry to give a cake.

Stage 3—Hydrolysis

The cake from Stage 2 was stirred under reflux for 4 hours in a mixture of 100 ml concentrated hydrochloric acid and 50 ml deionised water, and then allowed to cool to room temperature over 18 hours. The precipitated product was filtered off, sucked dry, well stirred in 1 liter of ethanol, again filtered and then washed with ethanol and sucked dry. The product was further dried in vacuo overnight over calcium chloride to give 28 g of monoazo product.

Stage 4

To a suspension of 2,4-dichloro-6-methanesulphonmethylamide (11.3 g) and calsolene oil (3 drops) in ice water was added a solution of the product from Stage 3 (24.9 g) in water (200 ml) at pH 7. When the addition was complete, the reaction mixture was stirred at 30°-35° C. and pH 6 to 6.5 for 20 hours. The mixture was cooled to room temperature and the product precipitated by the addition of 5% potassium chloride. The product was filtered off, stirred for 30 minutes in 1 liter of acetone, filtered off, washed with a little acetone and pulled dry. The cake was dissolved in 400 ml of deionised water, dialysed free from potassium chloride, screened and then dried in vacuo to give 27.4 g of title product as a red solid. Elemental analysis showed the product contained 11.4% Nitrogen (theory 11.0% Nitrogen).

EXAMPLE 15

Preparation of the compound of Formula (8) wherein L is 4-sulphophenyl, —$NR^1$ is connected to the 8-position, q is 1 and the sulphonic acid group is attached to the 6-position T is Cl, and $R^1$ is H, $R^2$ and $R^3$ are both methyl

Stage 1

2,4-dichloro-6-methanesulphonmethylamide-1,3,5-triazine (3.5 g) was condensed with H-Acid (7.8 g) at a pH below 3.5 over 20 hours in ice/water (100 ml).

Stage 2

To a solution of sulphanilic acid (4.7 g) in water (200 ml) at pH 7, below 10° C., was added 8 ml of concentrated hydrochloric acid and 12 ml of 2N sodium nitrite solution. After 30 minutes excess nitrous acid was destroyed by the addition of solid sulphamic acid. The resultant suspension was added dropwise over 30 minutes, at pH 4, below 10° C., to the product of Stage 1, and stirred at pH 4-5 for a further 3 hours, then allowed to reach room temperature. The product was precipitated by addition of 10% KCl solution and the precipitate dried, washed with acetone and further dried to give 12.2 g of title compound as a red solid. Elemental analysis showed the product contained 29.2% carbon (theory 29.5% carbon).

EXAMPLE 16

Preparation of the compound of Formula (8) wherein L is 4-sulphophenyl, —NR¹ is connected to the 8-position, q is 1 and the sulphonic acid group is attached to the 6-position, T is iso-nicotinyl, and R¹ is H, R² and R³ are both methyl The title product was prepared using the method of Example 5 on the 0.06 mole scale, except that in place of the product of Example 4 there was used the product from Example 15. Approximately 45 g of title product was obtained as a red solid.

This example can be repeated except that in place of iso-nicotinic acid there is used nicotinic acid to give a compound according to the title except that T is 3-carboxypyridinium.

EXAMPLE 17

Preparation of the compound of Formula (9) wherein T is Cl

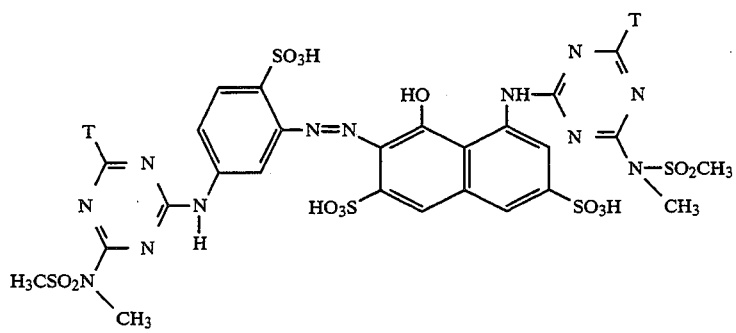

(9)

EXAMPLE 18

Preparation of the compound of Formula (9) wherein T is iso-nicotinyl

The product from Example 17 was converted into the title product on a 0.04 mole scale using the method of Example 5, except that in place of the product of Example 4 there was used an equivalent amount of the product from Example 17. The title compound was obtained in a yield of 26.1 g.

This example can be repeated except that in place of iso-nicotinic acid there is used nicotinic acid to give a compound according to the title except that T is 3-carboxypyridinium.

EXAMPLE 19

Preparation of

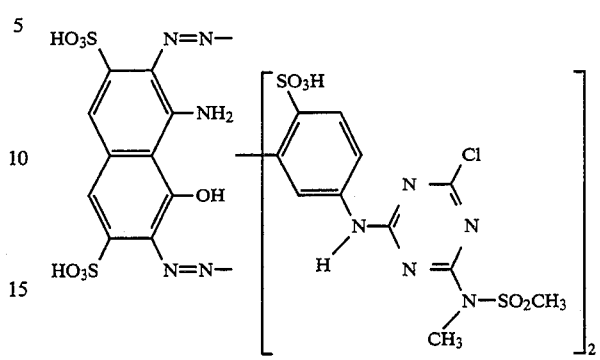

The title compound was prepared by coupling a first portion of the product of Example 4, Stage 1 with H-Acid under acidic conditions, followed by a second portion of the same under alkaline conditions, and allowing the reaction mixture to stir at room temperature for 18 hours. The product was precipitated by adding 10% KCl solution, and the precipitate filtered off, washed and dried to give the title compound as a dark blue solid. Elemental analysis showed the product contained 28.5% carbon (theory 28.5% carbon).

EXAMPLE 20

Anthraquinone Dye

Preparation of

The method described in Example 4 was followed on the 0.08 mole scale except that in place of N-benzoyl H-Acid there was used 0.08 moles of the product from Example 15, Stage 1, to give 25.9 g of the title product as a red solid. Elemental analysis showed the product contained 27.3% carbon (theory 27.6% carbon).

To a neutral aqueous solution of 1-amino-4-(3-sulpho-4-aminophenyl)aminoanthraquinone-2-sulphonic acid (20.28 g, 0.03 m, M.I. 676) was added a solution of N-4,6-dichloro-s-triazinylmethanesulphon methylamide (10.06 g, 0.039M). After stirring at 25° C. and pH 7 for 3½ hours the reaction was essentially complete. The product was precipitated, collected and dried. Yield 10 g.

EXAMPLE 21

Copper Phthalocyanine Dye

A solution of N-(2,4-dichlorotriazin-6-yl)methanesulphonmethyl amide (14.84 g, 0.0575M) in acetone (100 ml) was added to a stirred mixture of CuPc (3-SO$_3$H)$_{2.7}$(3-SO$_2$NHCH$_2$CH$_2$—N$_2$)$_{1.3}$ (27.4 g, M.I. 1096, 0.025M) in water (300 ml). The mixture was stirred at 35° C. and pH 8.0 to 8.5 (2N Na$_2$CO$_3$) for 16 hours. The solution was allowed to cool to 20° C., the pH was adjusted to 7.0 (2N HCl) and salt (28 g, 7% w/v) was added. The resulting precipitated solid was collected and dried. Yield 23.7 g.

EXAMPLE 22

Nickel Phthalocyanine Dye

The nickel phthalocyanine dyebase (23.39 g, M.I. 584.7, 0.04M) of the formula:

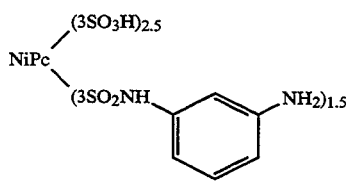

was dissolved in water (250 ml) at pH 7 (Na$_2$CO$_3$). A solution of N-(2,4-dichlorotriazin-6-yl)methanesulphonmethylamide (17.8 g, 0.069M) in acetone (100 ml) was added. The mixture was stirred at pH 7 and 20° C. for 4–5 hours, a small amount of insoluble material filtered off and salt (10% w/v, 40 g) was added to the stirred filtrate. The resulting precipitated dye was collected and dried. Yield 5.9 g.

EXAMPLE 23

Triphenodioxazine Dye 3,10-bis(4-amino-3-sulphophenylamino)-6,13-dichlorotripheno dioxazine-4,11-disulphonic acid (M.I. 2585, 25.85 g, 0.01M) was dissolved in water (300 ml) at pH 7. A solution of N-(2,4-dichlorotriazin-6-yl) methanesulphonmethylamide (5.93 g, 0.02M) in acetone (80 ml) was added and the mixture stirred at 25° C. and pH 7 for 3 hours. Salt (5% w/v) was added with stirring and the precipitated solid was collected, washed and dried. Yield 1.7 g, M.I. 1472.

EXAMPLE 24

Preparation of

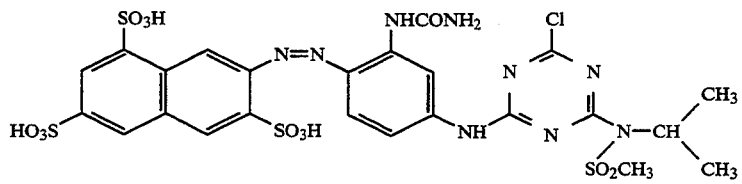

A solution of N-(2,4-dichlorotriazin-6-yl)methanesulphon iso propylamide (8.94 g, 0,031M) in acetone (100 ml) was added to a stirred solution of 3-ureido-4-(2,6,8-trisulphonaphth-2-ylazo)aniline (56.3 g, M.I. 2250, 0.025M). After stirring at 35° C. and pH 6.5 for 16 hours further of the above dichlorotriazine (9.2 g, 0.0325M) was added, and the mixture kept at 35° C. and pH 6.5 for 12 hours. The solution was concentrated under reduced pressure and methanol was added. The precipitated product was collected and dried to give 48 g of title product, M.I. 1040.

EXAMPLE 25

Preparation of

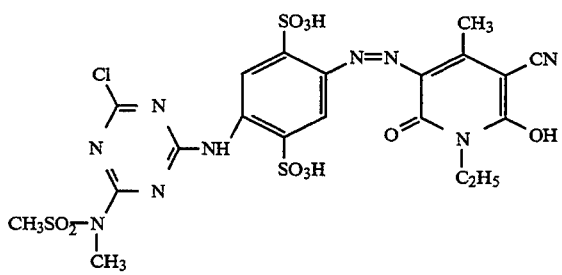

Stage 1

A mixture of 4,6-diaminobenzene-1,3-disulphonic acid (15 g, M.I. 300, 0.05M) in water (150 ml) at pH 2.5 was added to a solution of N-(2,4-dichlorotriazin-6-yl)methanesulphonmethylamide (20 g). The mixture was stirred for 72 hours at 20° C. without pH adjustment. A small amount of insoluble material was filtered off and the filtrate used direct to Stage 2.

Stage 2

The filtrate from Stage 1 was cooled to below 5° C. and 2N-sodium nitrite solution (25 ml, 0.05M) added slowly together with sufficient 2N-hydrochloric acid as to ensure the mixture was acid to Congo red indicator. After 2 hours excess nitrous acid was destroyed (sulphamic acid) and 2-hydroxy-3-cyano-4-methyl-N-ethyl-pyrid-6-one (8.75 g, 0.05M) was added. The pH was adjusted to 3.5 (2N Na$_2$CO$_3$), brine (40 g, 10% w/v) was added with stirring, and the precipitated title product collected. Yield 24.5 g, M.I. 627.

We claim:

1. A water soluble reactive dye of the Formula (5):

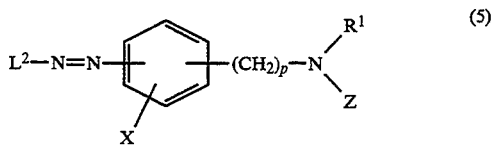

wherein each Z independently is:

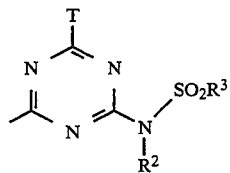

each $R^1$ independently is H or alkyl having up to four carbon atoms;

T is halo or 3- or 4-carboxypyridinium;

$R^2$ and $R^3$ are each independently a $C_{1-4}$-alkyl group;

p is 0 or 1;

$L^2$ is a substituted or unsubstituted mono- or di-cyclic aryl radical wherein the optional substituent is halogen, $C_{1-4}$-alkyl, acetylamino, benzamido, sulphonated benzamido, amino, hydroxy, $C_{1-4}$-alkoxy, vinyl sulphonyl, a group convertible to vinyl sulphonyl on treatment with base or —$NR^1Z$ wherein $R^1$ and Z are as hereinbefore defined; and X is halogeno, alkyl, alkoxy, sulpho, carboxy, ureido or acetamido.

2. A dye according to claim 1 wherein $R^2$ and $R^3$ are each independently methyl.

3. A dye according to claim 1 or claim 2 wherein X is halogeno, $C_{1-4}$-alkyl, $C_{1-4}$-alkoxy, carboxy, ureido or acetamido.

4. A water soluble reactive dye of the Formula (5):

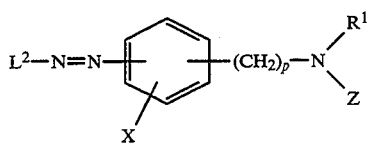

wherein each Z independently is:

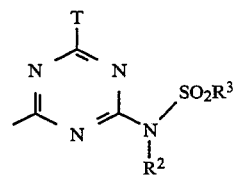

each $R^1$ independently is H or alkyl having up to four carbon atoms;

T is chloro;

$R^2$ and $R^3$ are each independently a $C_{1-4}$-alkyl;

p is 0 or 1;

$L^2$ is a substituted or unsubstituted phenyl or naphthyl group wherein the substituent is halogen, $C_{1-4}$-alkyl, acetylamino, benzamido, sulphonated benzamido, amino, hydroxy, $C_{1-4}$-alkoxy, vinyl sulphonyl, a group convertible to vinyl sulphonyl on treatment with base or —$NR^1Z$ wherein $R^1$ and Z are as hereinbefore defined; and X is halogeno, $C_{1-4}$-alkyl, $C_{1-4}$-alkoxy, sulpho, carboxy, ureido or acetamido.

5. A process for the coloration of a cellulosic material by applying thereto a compound according to claim 1.

* * * * *